United States Patent
Wingen et al.

(10) Patent No.: US 6,550,853 B2
(45) Date of Patent: Apr. 22, 2003

(54) OPENABLE MOTOR VEHICLE ROOF

(75) Inventors: Bernhard Wingen, Feldkirchen (DE); Wolfgang Seifert, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/986,994

(22) Filed: Nov. 13, 2001

(65) Prior Publication Data

US 2002/0089216 A1 Jul. 11, 2002

(30) Foreign Application Priority Data

Nov. 10, 2000 (DE) .......................................... 100 55 790

(51) Int. Cl.[7] .............................................. B60J 7/047
(52) U.S. Cl. ............................. 296/216.03; 296/216.08
(58) Field of Search ...................... 296/216.02, 216.03, 296/216.07, 216.08, 223

(56) References Cited

U.S. PATENT DOCUMENTS 5,154,482 A * 10/1992 Hayashi et al. ............. 296/223
6,312,047 B1 * 11/2001 Tsuruo et al. ............... 296/223
6,428,091 B2 * 8/2002 Ito et al. .................. 296/223 X

FOREIGN PATENT DOCUMENTS

| DE | 33 45 122 A1 | 7/1984 |
| DE | 197 44 907 A1 | 4/1999 |

* cited by examiner

Primary Examiner—Dennis H. Pedder
(74) Attorney, Agent, or Firm—Nixon Peabody LP; David S. Safran

(57) ABSTRACT

An openable motor vehicle roof, which is provided with a carrier (16) for a cover element (10) for a roof opening (12) which is movably guided in the lengthwise direction of the roof by means of a first slide element (18) and a second slide element (22) which are offset relative to one another and extend in the lengthwise direction of the roof in the roof-mounted guide (40), the first slide element (18) being guided in the vertical direction along a first guideway (20) and the second slide element (22) along a second guideway (24), and the first and the second guideway (20 and 24) being at different vertical levels. In contrast to known motor vehicle roofs, the first guideway (20) and the second guideway (24) are offset relative to one another in the transverse direction of the roof.

13 Claims, 2 Drawing Sheets

OPENABLE MOTOR VEHICLE ROOF

BACKGROUND OF THE INVENTION

1. Field of the Invention

This invention relates to an openable motor vehicle roof with a carrier for a cover element for a roof opening which is movably guided in the lengthwise direction of the roof by means of a first slide element and a second slide element which are offset relative to one another in the lengthwise direction of the roof in a roof-mounted guide, the first slide element being guided in the vertical direction along a first guideway and the second slide element along a second guideway, and the first and the second guideways being at different vertical levels.

2. Description of Related Art

A motor vehicle roof of the initially mentioned type is known, for example, from published German Patent Application DE 33 45 122 A1, the cover element being the cover of a spoiler roof, i.e., the first and the second guideway being made such that the cover can be raised, proceeding from the closed position, at its rear edge and can be pushed to the rear in this position in order to clear the roof opening. The first and the second guideway are made as cam slots in a roof-mounted guide, and in the lengthwise direction of the roof, are arranged in succession, a respective cover-mounted pin fitting into each of the cam slots. In the area of the front pin, there is a sliding block which is driven by a drive cable and which fits into a roof-mounted guide rail which is located opposite the roof-mounted guide. The disadvantage in this construction is that, on the one hand, a guide is necessary as an additional component, the course of the cam slots is limited such that their crossing is precluded, and furthermore, there is stable guidance of the cover only in the front area of the cover by means of the sliding block.

SUMMARY OF THE INVENTION

A primary object of this invention is to devise an openable motor vehicle roof in which the cover element can be raised by the engagement of the two slide elements attached to the cover element into two different guideways, yet a configuration of the guideways that is as flexible as possible, and a guidance of the cover element that is as stable as possible overall are obtained.

This object is achieved in accordance with the invention by a motor vehicle roof in which the first guideway and the second guideway are offset relative to one another in the transverse direction of the roof. In this approach according to the invention, it is advantageous that the first and the second guideways are offset relative to one another in the transverse direction of the roof because it enables the two guideways to be designed independently of one another so as to never cross, and furthermore, maximum stability of guidance can be achieved.

One embodiment of the invention is explained in detail below with reference to the accompanying drawings.

DETAILED DESCRIPTION OF THE INVENTION

Figure 1:
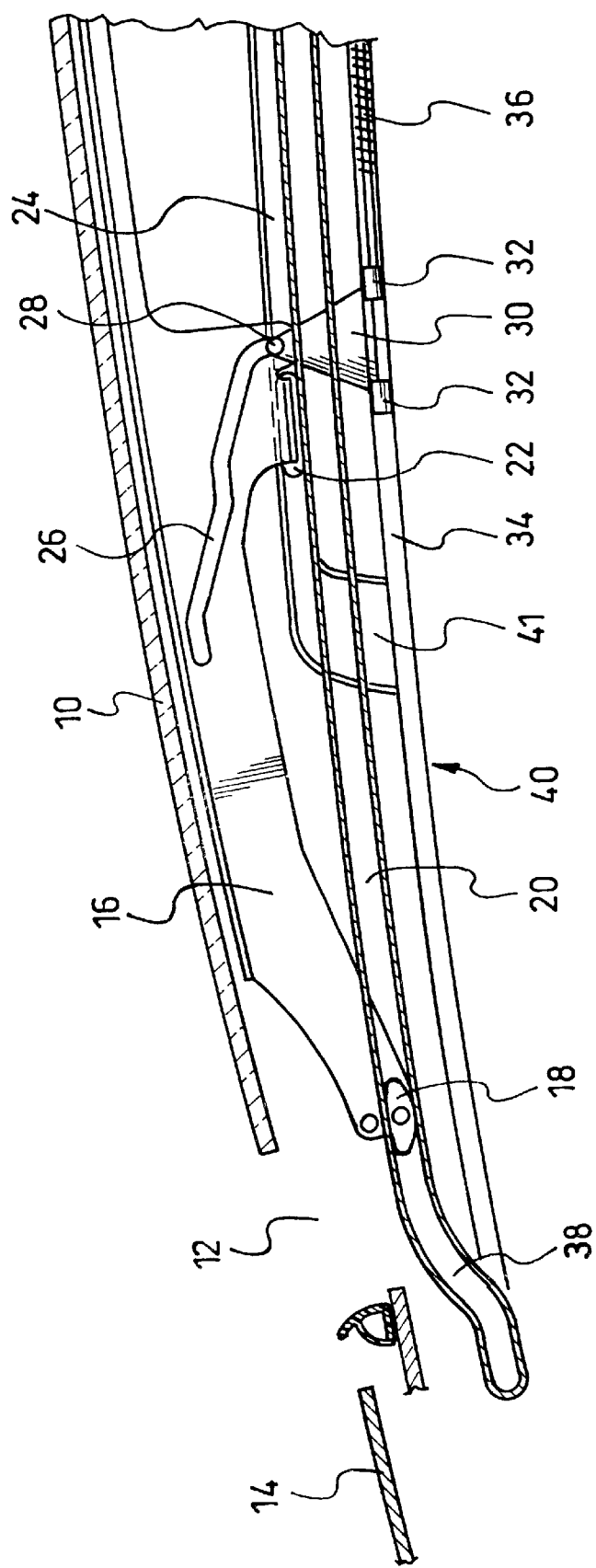
FIG. 1 is a side view of a motor vehicle roof in accordance with the invention and FIG. 2 is a cross sectional view of the guide rail shown in FIG. 1.

On a cover 10 which is designed to cover an opening 12 in a fixed roof skin 14, there is a carrier 16 which is provided with a slide element 18 on its front end, the slide element 18 being guided to be able to move with respect to the vertical direction in a first guide channel 20 that extends in the lengthwise direction of the roof. In its middle area, the carrier 16 is provided with a second slide element 22 which is guided in a second longitudinally extending guide channel 24, likewise with respect to the vertical direction. Furthermore, in the area of the second or rear slide element 22, a cam slot 26 is formed in the carrier 16 into which a pin 28 fits. Pin 28 is provided on a carriage 30 which is movably guided by means of two sliding blocks 32 which fit into a third roof-mounted guide channel 34 which extends in the lengthwise direction of the roof. The carriage 30 is driven in a known manner by a compressively-stiff drive cable 36 which, in turn, is driven by a drive (not shown) and which can be made in a conventional manner, i.e., with an electric motor and a driving pinion which is driven by it and which fits into the drive cable 36. Aside from the starting area 38, 41, the guide channels 20, 24 run essentially horizontally, but the guide channel 24 for the rear slide element 22 lying higher in its horizontal part than the guide channel 20 for the front slide element 18. The guide channel 34 for the carriage 30 runs continuously essentially horizontally and is lower than the other two guide channels 20, 24.

Figure 2:
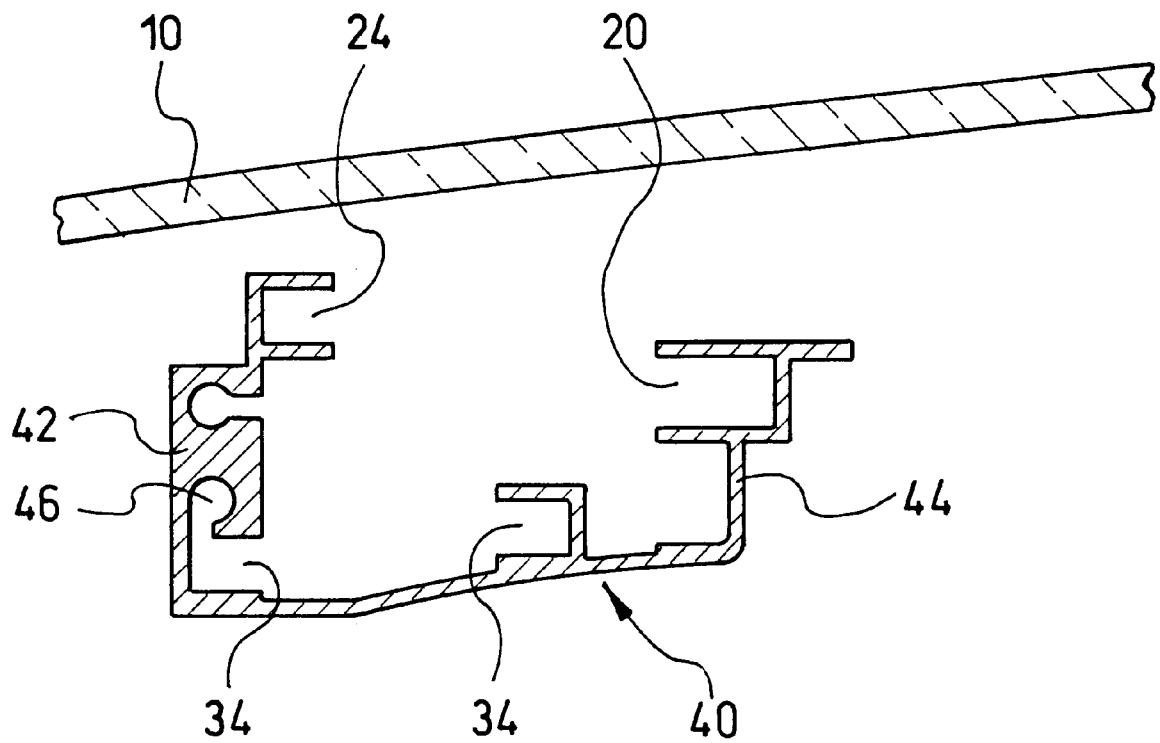

As is apparent from FIG. 2, the guide channels 20, 24 and 34 form a part of an essentially U-shaped, roof-mounted guide 40, the guide channel 24 for the rear slide element 22 being made on the inside of the outer leg 42 of the guide 40, while the guide channel 20 for the front slide element 18 is made on the inside of the inner leg 44 of the guide 40. The guide channel 34 for the carriage 30 is made in the bottom area of the rail 40 and runs in part in the outer leg 42 where there is also a cable channel 46. The starting areas 38, 41 of the guide channels 20, 24 are made as separate parts which are inserted into the guide 40 or otherwise attached thereto.

In FIG. 1, the cover 10 is shown in the partially opened state. This position is reached by the cover proceeding from the closed position, in which the front slide element 18 is in the horizontal forward area of the inserted part 38, the crank pin 28 of the carriage 30 lies on the forward end of the cam slot 26 and the rear slide element 22 lies underneath the inserted part 40 by the carriage 30 being moved to the rear by the drive cable 36. In doing so, first the cover carrier 16 is prevented from executing an essentially displacement motion in the lengthwise direction of the roof by the rear sliding block 22 lying in the almost vertical starting area 41 so that the crank pin 28 can slide to the rear in the cam slot 26. In this way, as a result of the configuration of the cam slot 26, the cover 10 is raised at its rear edge, but essentially no displacement of the cover to the rear occurring.

By means of the raising motion of the cover 10, the rear sliding block 22 is also raised up until, in the almost vertically running starting area of the inserted part 41, it reaches the horizontal part of the guide channel 24, and in this way, the blockage of the displacement motion is released. In doing so, the crank pin 28 is in the almost vertically running back end area of the cam slot 26. Further displacement of the carriage 30 to the rear at this point, by means of contact of the crank pin 28 with the back end of the cam slot 26, causes the carrier 16, and thus the cover 10, to be entrained so as to be displaced to the rear. In doing so, the front sliding block 18 travels into the ascending area of the inserted part 38, raising the front edge of the cover until the sliding block 18 enters the horizontal part of the guide channel 20. As the opening motion continues, the cover is pushed in this raised position with its rear edge over the fixed roof skin to clear the roof opening 12.

Closing motion takes place in the reverse direction, the contact of the crank pin 28 with the vertical back end area of the cam slot 26 providing for entrainment of the carrier 16 and thus of the cover 10. The guide channels 20, 24 are thus used, aside from the start of the opening motion, as guide paths for raising and moving the cover 10. Because the guideways 20, 24 are offset in the transverse direction of the roof on the opposing legs 42, 44 of the guide rail 40, crossing of the two guideways 20, 24 is prevented, and furthermore, the stability of guidance of the cover carrier 16 is improved.

Instead of one cover 10, there can also be two successive, essentially identical covers in order to form a so-called double spoiler roof. The raising mechanism is thus made essentially identical for the two covers.

What is claimed is:

1. Openable motor vehicle roof, comprising:
    a cover element for a roof opening which is pivotable and slidable;
    a roof-mounted guide;
    a first slide element and a second slide element which are offset relative to one another in a lengthwise direction of the roof in the roof-mounted guide; and
    a carrier for the cover element which is movably guided in the lengthwise direction of the roof by the first slide element and the second slide element, the first slide element being guided in a vertical direction along a first guideway and the second slide element being guided along a second guideway, and the first and the second guideways being at different vertical levels and being offset relative to one another in a transverse direction of the roof, and the second guideway having a starting area with a vertically oriented surface area for blocking sliding movement of the second slide element during pivoting of the cover and having a horizontally oriented surface area that is vertically offset with respect to said starting area for enabling sliding of said second slide element after pivoting of the cover; and wherein said starting area and said horizontal area are closed from above for preventing disengagement of the second sliding element from the second guideway.

2. Motor vehicle roof as claimed in claim 1, wherein the cover element is the cover of a spoiler roof, the first guideway and the second guideway being arranged to cause a raising motion of the cover element at a rear edge thereof from a closed position of the cover element in which the first slide element is in a starting area of the first guide way and the second slide element is in the starting area of the second guide way and displacement of the carrier to the rear in order to clear the roof opening.

3. Motor vehicle roof as claimed in claim 1, wherein the roof-mounted guide is a rail, the first and the second guideways being made on opposite sides of the rail.

4. Motor vehicle roof as claimed in claim 3, wherein the roof-mounted guide, in cross section, is essentially U-shaped and the first guideway and the second guideway are made on the inside of the opposite sides.

5. Motor vehicle roof as claimed in claim 2, wherein the roof-mounted guide is a rail, the first and the second guideways being made on opposite sides of the rail.

6. Motor vehicle roof as claimed in claim 5, wherein the roof-mounted guide, in cross section, is essentially U-shaped and the first guideway and the second guideway are made on the inside of the opposite sides.

7. Motor vehicle roof as claimed in claim 6, wherein the first guideway and the second guideway run essentially horizontally, aside from said starting areas thereof.

8. Motor vehicle roof as claimed in claim 7, wherein the first guideway and the second guideway ascend in their starting areas.

9. Motor vehicle roof as claimed in claim 8, wherein the starting area of at least one of the first guideway and the second guideway is a part inserted into the roof-mounted guide.

10. Motor vehicle roof as claimed in claim 1, wherein the first guideway and the second guideway run essentially horizontally, aside from starting areas thereof.

11. Openable motor vehicle roof, comprising:
    a cover element for a roof opening;
    a roof-mounted guide;
    a first slide element and a second slide element which are offset relative to one another in a lengthwise direction of the roof in the roof-mounted guide; and
    a carrier for the cover element which is movably guided in the lengthwise direction of the roof by the first slide element and the second slide element, the first slide element being guided in a vertical direction along a first guideway and the second slide element being guided along a second guideway, and the first and the second guideways being at different vertical levels and being offset relative to one another in a transverse direction of the roof;
    wherein the first guideway and the second guideway run essentially horizontally, aside from starting areas thereof and wherein the first guideway and the second guideway ascend in their starting areas.

12. Motor vehicle roof as claimed in claim 11, wherein a starting area of at least one of the first guideway and the second guideway is a part inserted into the roof-mounted guide.

13. Motor vehicle roof as claimed in claim 10, wherein a starting area of at least one of the first guideway and the second guideway is a part inserted into the roof-mounted guide.

* * * * *